United States Patent [19]
Stich et al.

[11] 3,865,602
[45] Feb. 11, 1975

[54] PROCESS FOR THE MANUFACTURE OF CEMENT CLINKER AND SULPHUR DIOXIDE

[75] Inventors: Heinrich Stich; Walter Binder; Josef Hutter; Helmut Marecek, all of Linz/Donau, Austria

[73] Assignee: Osterreichische Stickstoffwerke Aktiengesellschaft, Linz/Donau, Austria

[22] Filed: Oct. 16, 1972

[21] Appl. No.: 297,708

[30] Foreign Application Priority Data
Oct. 14, 1971  Austria .................... 8869/71

[52] U.S. Cl. .............. 106/103, 423/541, 423/542, 432/16
[51] Int. Cl. ............................................ C04b 7/04
[58] Field of Search ............ 106/103; 423/530, 541, 423/542; 432/16

[56] References Cited
UNITED STATES PATENTS
2,757,921  8/1956  Petersen ...................... 432/16
3,491,991  1/1970  Abelitis ........................ 432/16

FOREIGN PATENTS OR APPLICATIONS
1,235,864  6/1971  Great Britain ................ 106/103

Primary Examiner—Delbert E. Gantz
Assistant Examiner—S. Berger
Attorney, Agent, or Firm—Wenderoth, Lind & Ponack

[57] ABSTRACT

A process for the manufacture of cement clinker and sulphur dioxide from calcium sulphate according to the so-called gypsum-sulphuric acid process in which the raw material is preheated in the suspension state by the gases issuing from the kiln. The entrained air issuing upwardly through the seals in the furnace head is used up as tertiary air and the remainder of the tertiary air used for achieving the reaction process is fed to the suspension gas heat exchanger in one or several streams.

1 Claim, 1 Drawing Figure

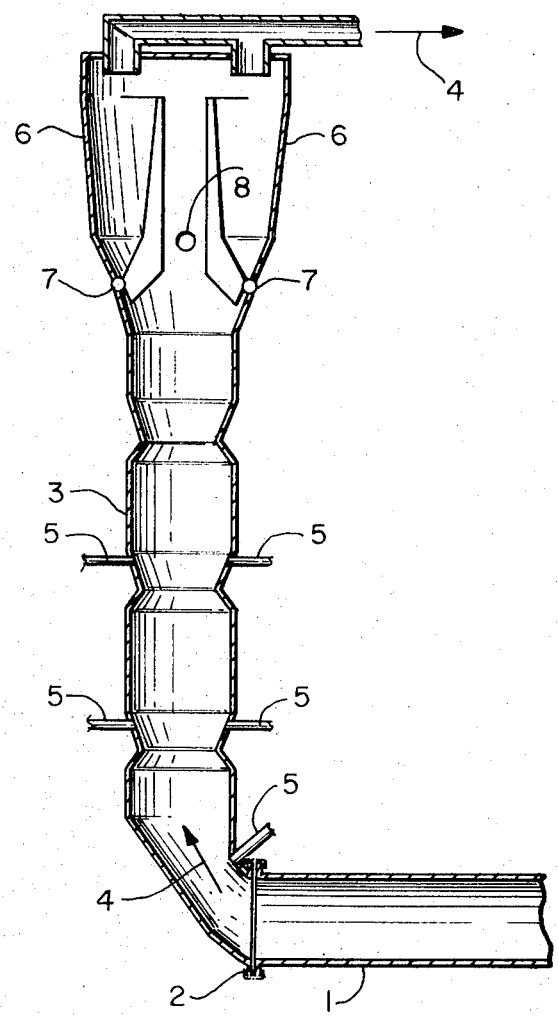

PROCESS FOR THE MANUFACTURE OF CEMENT CLINKER AND SULPHUR DIOXIDE

BACKGROUND OF THE INVENTION

The present invention relates to a process for the manufacture of cement clinker and sulphur dioxide according to the so-called gypsum-sulphuric acid process, in which the crude power is preheated in the suspension state by the issuing furnace gases. The invention combines the advantages of optimum heat utilisation with good yield of sulphur dioxide and optimum clinker quality.

The preheating of crude powder for the manufacture of cement in the suspension state in so-called suspension gas heat exchangers has proved successful in the cement industry (U.S. Pat. No. 3,491,991). The application of this preheating to the so-called gypsum-sulphuric acid process is more difficult however, since in such process coke is contained in the crude powder, inter alia, as additive. However, the carbon begins to burn away at a higher oxygen content in the gas phase in the heat exchanger and is thus disadvantageously withdrawn from the reaction as soon as temperatures in the range of 720° to 780° C are reached. A higher oxygen content in the gas phase is however very difficult to avoid, since it is hardly possible to make the transition from the rotary furnace to the suspension gas heat exchanger so exact that uncontrollable amounts of air do not enter the suspension gas heat exchanger.

In order to overcome this difficulty, a suspension gas preheating with at least two steps has been proposed in Austrian Pat. No. 273,784, in which the additive containing carbon is carried into the suspension gas preheater separately from the calcium sulphate, at a point where the gases have been cooled by the previous introduction of gypsum to below the temperature which would permit a partial burning away of the coke. An undesirable rise in temperature is avoided by the addition of water which is introduced either in the form of moist gypsum or by direct spraying. This process has the disadvantage that the multiple introduction results in a relatively high investment in conveying devices and that useful heat is lost by the introduction of water.

In order to circumvent these disadvantages it has been proposed in West German Offenlegungsschrift DOS 2,044,048 to maintain a reducing atmosphere by introducing a reducing flame into the rotary furnace so that the content of reducing constituents in the furnace atmosphere, namely carbon monoxide, sulphur and hydrogen sulphide is regulated so that the oxygen content of the gases which leave the suspension heat exchanger is adjusted to a maximum of 0.5 percent by the entrained air penetrating the rotary furnace head and that the carbon monoxide content is adjusted to at least 0.1 percent. In order to achieve this, in accordance with DOS 2,044,048 about 0.2 $Nm^3$ of carbon monoxide is provided per $Nm^3$ of entrained air, which is supposed to react preferably with the oxygen of the entrained air at the prevailing gas temperature of 750° to 800° C at the furnace head.

In the above process it is thus necessary to adjust the flame in the rotary furnace by variation of the supply of fuel and/or air, so that the reducing compounds in the furnace atmosphere are just sufficient to eliminate the interfering content of oxygen. This means it is very difficult to keep control of the firing of the furnace, since an excess of reducing constituents means a loss in yield of sulphur dioxide, while too high a content of oxygen brings about the already mentioned losses of carbon in the crude powder. However, in practice the entrained air which enters is not constant, since the distance between furnace and furnace head continually changes due to the longitudinal displacements of the rotary furnace within a necessary amount of play, and the seals usually quickly lose their flexibility under the influence of dust deposits and corrosion and can then no longer cope with these displacements. It is practically impossible to even out the fluctuations in the amount of entrained air caused by this by continuous variation of the flame, unless irregular firing and the consequent variable quality of the clinker are tolerated.

In one of the usual embodiments of the gypsum-sulphuric acid process not all the air required for the reaction is charged in with the flame or in the immediate vicinity of the flame, but the remainder which is necessary for adjusting the usual oxygen content of the flue gases at 0.1 to 0.5 percent, is blown into the heat exchanger. This so-called "tertiary air" usually amounts to 5 to 25 percent of the total air required for the reaction. This amount of air is certainly higher than the entrained air entering at the furnace head seals.

SUMMARY OF THE INVENTION

It has been found that it is possible to use up the entrained air as a portion of the teriary air, in such processes operating with the addition of teriary air. Thus it is necessary to feed only the remainder of the tertiary air in the suspension gas heat exchanger, without thereby in any way unfavourably influencing the process. This has the advantage that the amount of remaining tertiary air fed into the suspension gas heat exchanger easily may be adjusted so that the oxygen content of the gas in the heat exchanger is maintained with the required precision, to avoid consumption of the carbon.

The present invention accordingly provides a process for the manufacture of cement clinker and sulphur dioxide from calcium sulphate according to the gypsum sulphuric acid process comprising a calcination step in a rotary furnace and a preheating step for the crude furnace powder prior to its introduction into the rotary furnace in a suspension gas zone using the issuing flue gases, whereby the suspension gas zone of the preheating step is followed by the calcination zone of the calcination step. A portion of the air necessary for the reaction process is added as tertiary air in at least two partial streams in an amount being sufficient to provide an oxygen content of 0.1 to 0.5 percent by volume in the flue gases leaving the suspension gas zone. The air intruding into the transition section between the calcination zone and the suspension gas zone acts as a first partial stream, whereby the rest of the tertiary air is introduced into the suspension gas zone in at least one further partial stream. The gas temperature at the point where the first partial stream enters is at least 870° C and at the point of introduction of the second partial stream maximally 800° C.

Adherence to the temperatures at the rotary furnace head and in the suspension gas heat exchanger is important for obtaining an optimum utilisation of the waste heat without loss of quality and/or yield.

The optimum location of the point or points at which the remainder of the tertiary air is/are located depends on not only the gas temperature prevailing there within the limits in accordance with the invention, but also on other factors, such as particle size and reactivity of the coke, and the flow conditions in the heat exchanger.

In practice provision will be made for several inlet points and the most favourable point or points of installation for a given operation will be determined. The criterion for the choice of the most favorable location/locations is that as little coke as possible suffices for the reduction of the calcium sulphate. By blowing in air at several locations rapid mixing of the crude powder with the flue gases and the total oxidation of the gaseous constituents which can still be oxidised may be facilitated.

By utilising the process in accordance with the invention it is possible to heat the crude powder so high, in a relatively simple manner and with a better utilisation of the flue gas heat, that the chemical reactions mentioned hereinbefore already start in the suspension gas heat exchanger without significant oxidation of coke to carbon dioxide. In this manner it is also easier to cool the temperature of the flue gases leaving the suspension gas preheater to 300° to 350°C, that is the temperature region below which operation should not be carried out, in order to avoid corrosion damage by condensed sulphuric acid of the electrostatic precipitators which follow.

BRIEF DESCRIPTION OF THE DRAWING

The single FIGURE is a cross-sectional schematic view of an installation illustrating the use of the process of the present invention.

DETAILED DESCRIPTION OF INSTALLATION FOR CARRYING OUT PROCESS OF INVENTION

With reference to the drawing, an end 1 of a rotary furnace has attached thereto by means of a furnace head seal 2 a stationary suspension gas heat exchanger 3. Seal 2 is normally worn and thus allows air to enter the system. This air is used to form a first partial stream of the tertiary air. The flow of the gases issuing from the furnace and used to heat the crude powder is indicated by arrows 4. The exchanger 3 has cyclones 6, sluices 7 and crude powder inlet 8. A plurality of inlets 5 are provided for the remainder of the tertiary air.

EXAMPLE

A rotary furnace, which is followed by a suspension gas heat exchanger operating in a counter-current manner, is fed with 20 tons per hour of crude powder, which in accordance with the requirements of the gypsum-sulphuric acid process consists mainly of calcium sulphate and moreover coke and components containing $SiO_2$, $Al_2O_3$ and $Fe_2O_3$. 10 tons per hour of clinker are obtained with a heat consumption of 1500 thermal units per kg of clinker, which are generated by burning 1500 kg of heating oil per hour in the hot end of the rotary furnace. 19,500 $Nm^3$/hour of air are necessary for the complete combustion of the heating oil and of the small amount of excess coke, which is not used for the reduction of calcium sulphate, and furthermore in order to have 0.1 percent of oxygen in the flue gas after the heat exchanger. 3,000 $Nm^3$/hour thereof are fed to the oil burner as primary air. 14,500 $Nm^3$/hour are preheated in the clinker cooler and fed as secondary air into the furnace. In this manner a carbon monoxide content of about 4 percent results in the furnace atmosphere. Of the missing 2,000 $Nm^3$/hour (i.e. the tertiary air), about half enters through the furnace head seal 2 as entrained air, while the rest is fed into the suspension gas heat exchanger through one or more inlets 5 as a stream which can be controlled. The residual amount is metered in such a manner that the oxygen content in the flue gas after the heat exchanger is 0.1 percent by volume. The temperature of the flue gas is approximately 350°C. At the point of introduction of the residual amount of tertiary air the gas temperature is approximately 800°C and the temperature of the material approximately 450°C. The furnace gas temperature is 900°C on leaving the rotary furnace.

What we claim is:

1. In a process for the manufacture of cement clinker and sulphur dioxide from calcium sulphate by the gypsum-sulphuric acid process including a calcination step in a rotary furnace and a preheating step for the crude furnace powder, prior to its introduction into the rotary furnace, in a suspension gas zone, the suspension gas zone of the preheating step being followed by a calcination zone of the calcination step, said preheating step being carried out by flue gases issuing from said furnace, the improvement comprising:

introducing into said suspension gas zone as tertiary air a portion of the air required for said gypsum-sulphuric acid process in an amount to provide an oxygen content of 0.1 to 0.5 percent by volume in the flue gases leaving said suspension gas zone, said step of introducing comprising:

passing into said suspension gas zone, as a first partial tertiary air stream, air which intrudes into a transition area between said suspension gas zone and said calcination zone at a point where the temperature of said flue gases is at least 870°C; and introducing into said suspension gas zone the remainder of said amount of said tertiary air in at least one second partial tertiary air stream at at least one point where the temperature of said flue gases is maximally 800°C.

* * * * *